US012420545B2

(12) United States Patent
Diehm et al.

(10) Patent No.: US 12,420,545 B2
(45) Date of Patent: Sep. 23, 2025

(54) DEVICE FOR ALIGNING MAGNETIC OR MAGNETIZABLE PARTICLES AND MACHINE FOR GENERATING OPTICALLY VARIABLE IMAGE ELEMENTS

(71) Applicant: KOENIG & BAUER AG, Würzburg (DE)

(72) Inventors: Tobias Diehm, Wertheim (DE); Michael Müller, Karlstadt (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/867,822

(22) PCT Filed: Aug. 2, 2023

(86) PCT No.: PCT/EP2023/071454

§ 371 (c)(1),
(2) Date: Nov. 21, 2024

(87) PCT Pub. No.: WO2024/088611

PCT Pub. Date: May 2, 2024

(65) Prior Publication Data

US 2025/0170818 A1 May 29, 2025

(30) Foreign Application Priority Data

Oct. 25, 2022 (DE) ..................... 10 2022 128 121.3

(51) Int. Cl.
*B41F 31/18* (2006.01)
*B41F 11/02* (2006.01)

(52) U.S. Cl.
CPC .............. *B41F 31/18* (2013.01); *B41F 11/02* (2013.01)

(58) Field of Classification Search
CPC ................................ B41F 31/18; B41F 11/02
See application file for complete search history.

(56) References Cited

U.S. PATENT DOCUMENTS

2020/0346479 A1* 11/2020 Schmid .................. B05D 3/207
2023/0241881 A1* 8/2023 Kreps ................... B41F 19/001 101/216

FOREIGN PATENT DOCUMENTS

DE 102021105635 A1 9/2022
EA 038007 B1 6/2021
(Continued)

OTHER PUBLICATIONS

International Search Report of PCT/EP2023/071454 dated Nov. 9, 2023.

*Primary Examiner* — Stephen D Meier
*Assistant Examiner* — Leo T Hinze
(74) *Attorney, Agent, or Firm* — MATTINGLY & MALUR, PC

(57) ABSTRACT

Examples include a device for aligning magnetic or magnetizable particles contained in a coating agent applied to one side of a web-format or sheet-format substrate. An alignment device comprises one or more magnetic elements that, during normal operation, are fixed to a frame at the transport path and, in a working position, enter into magnetic interaction with magnetic or magnetizable particles on the substrate guided past the device along the transport path. The one or more magnetic elements are arranged at a carrier that extends transversely to the transport direction over a working width provided for processing the substrate. The carrier is mounted, on both sides, in or at a respective guide and can be moved in or at the guide, together with the one or more magnetic elements, along a movement path from the working position into a makeready position.

14 Claims, 8 Drawing Sheets

(56) References Cited

FOREIGN PATENT DOCUMENTS

| | | | |
|---|---|---|---|
| WO | 2022069107 | A1 | 4/2022 |
| WO | 2022189098 | A1 | 9/2022 |

* cited by examiner

DEVICE FOR ALIGNING MAGNETIC OR MAGNETIZABLE PARTICLES AND MACHINE FOR GENERATING OPTICALLY VARIABLE IMAGE ELEMENTS

CROSS-REFERENCES TO RELATED APPLICATIONS

This application is the US national phase, under 35 USC § 371, of PCT/EP2023/071454, filed on Aug. 2, 2023, published as WO 2024/088611 A1 on May 2, 2024, and claiming priority to DE 10 2022 128 121.3 filed on Oct. 25, 2022, and all of which are incorporated by reference herein in their entireties.

TECHNICAL FIELD

Some examples herein relate to a device for aligning magnetic or magnetizable particles, and to a machine for generating optically variable image elements. For example, the device may align magnetic or magnetizable particles contained in a coating agent applied to one side of a web-format or sheet-format substrate. The device includes an alignment device that comprises one or more magnetic elements which, during normal operation, are fixed to a frame at the transport path so as to, in a working position, enter or be able to enter into magnetic interaction with the magnetic or magnetizable particles on the substrate to be guided past the device along the transport path. The one or more magnetic elements are arranged at a carrier that extends transversely to the transport direction over a working width provided for processing the substrate.

Additionally, examples include a machine for generating optically variable image elements of a substrate, including a substrate infeed, from which the substrate to be processed can be fed to the machine, and at least one application device by which a coating agent containing magnetic or magnetizable particles can be applied onto at least a first side of the substrate that is guided through the machine on a transport path. The machine may further include a product receiving system used to receive the substrate to be processed in the machine, and a magnetic cylinder provided in the transport path of the substrate between the application device and the product receiving system. The magnetic cylinder may encompass a plurality of magnetic elements around the circumference, and an alignment device may be arranged upstream from the magnetic cylinder and/or an alignment device may be assigned to the magnetic cylinder at the transport path of the substrate.

BACKGROUND

A securities printing machine for generating optically variable image elements on a substrate is known from WO 2022/069107 A1, which comprises a magnetic cylinder as well as, in one embodiment, both an alignment device that is arranged upstream from the magnetic cylinder in the transport path and a stationary alignment device that is assigned to the magnetic cylinder, which can be pivoted away from the transport path into a makeready position.

WO 2022/189098 A1 discloses a securities printing machine comprising multiple printing units and multiple magnetic cylinders following downstream, each having a pre-alignment device arranged upstream therefrom and a simultaneous alignment device assigned thereto.

SUMMARY

It is an object of some examples herein to create an improved device for aligning magnetic or magnetizable particles as well as a machine for generating optically variable image elements.

The object is achieved according to the examples herein by the alignment device discussed above for aligning magnetic or magnetizable particles (P) contained in a coating agent. For example, the carrier that extends transversely to the transport direction may be mounted, on both sides, in or at a respective guide, which are provided directly in frame walls of a frame carrying the alignment device or at side panels arranged at the frame walls. Further, the carrier may be mounted to be movable, together with the magnetic elements, overall, that is, with each of the components thereof, by way of a translatory movement in or at the guides, in a guided manner, along a movement path from a working position into a make-ready position that is spaced apart from the working position. Further, the machine discussed above for generating optically variable image elements may include the alignment device described above.

The advantages achievable with the invention are in particular that substrates having optically variable image elements can be produced with a three-dimensional impression in high quality and/or improved contrast and/or greater luminance and/or an improved 3D effect, that is, a spatial impression.

It is of particular advantage with the solution according to the invention that a positioning of an alignment device that, during regular operation, is stationary, can be carried out by magnetic elements encompassed thereby, without having to take accessibility into account and/or having to maintain a larger clearance therebeside or thereabove, as would be the case, for example, during a pivoting about a fixed axis.

It is also of great advantage that such a device can be individually adapted to various machines or placements within the same machine without major effort. This applies in particular to a design in which guides are provided in detachable side panels.

A design of the device for pre-orientation is particularly advantageous. After printing ink containing magnetic or magnetizable particles has been applied, the particles are present in the ink matrix in a substantially unorganized manner. By carrying out, initially, a homogeneous alignment, a background offering greater contrast can be created for a subsequent image-producing alignment.

A design of the device for simultaneous alignment in which, during the image-producing alignment, the particles can simultaneously be exposed to a magnetic force which, for example, brings about a position of the platelet-shaped particles that is particularly rich in contrast is likewise particularly advantageous.

In a design according to the invention, the device for alignment is designed in such a way that a carrier carrying the magnetic elements is mounted on both sides in or at at least one respective guide and can be moved in or at the guide, together with the magnetic elements, in particular in a guided manner, along a movement path, that is, by way of a translatory movement, in particular a movement overall, from the working position into a makeready position, which is in particular spaced further apart from the transport path.

In a particularly advantageous refinement in which the guides are provided in or at side panels, which in turn are detachably arranged at frame walls of a frame carrying the alignment device, such guides can be individually provided in the side panels, without having to individually manufacture each of the frames.

In a machine for generating optically variable image elements on a substrate, such an alignment device can then be used, or also retrofitted, at various points and in various numbers using simple means, without having to keep a large clearance available for extensive pivoting movements. This is in particular of advantage for machines or machine parts in which, for example, no linear conveyor lines having sufficient clearances are provided, but a substrate transport solely takes place by cylinder-to-cylinder transfer.

Further details and variant embodiments may be derived from the following exemplary embodiments.

BRIEF DESCRIPTION OF THE DRAWINGS

Exemplary embodiments of the invention are illustrated in the drawings and will be described in greater detail below. The drawings show.

DETAILED DESCRIPTION

Figure 1:
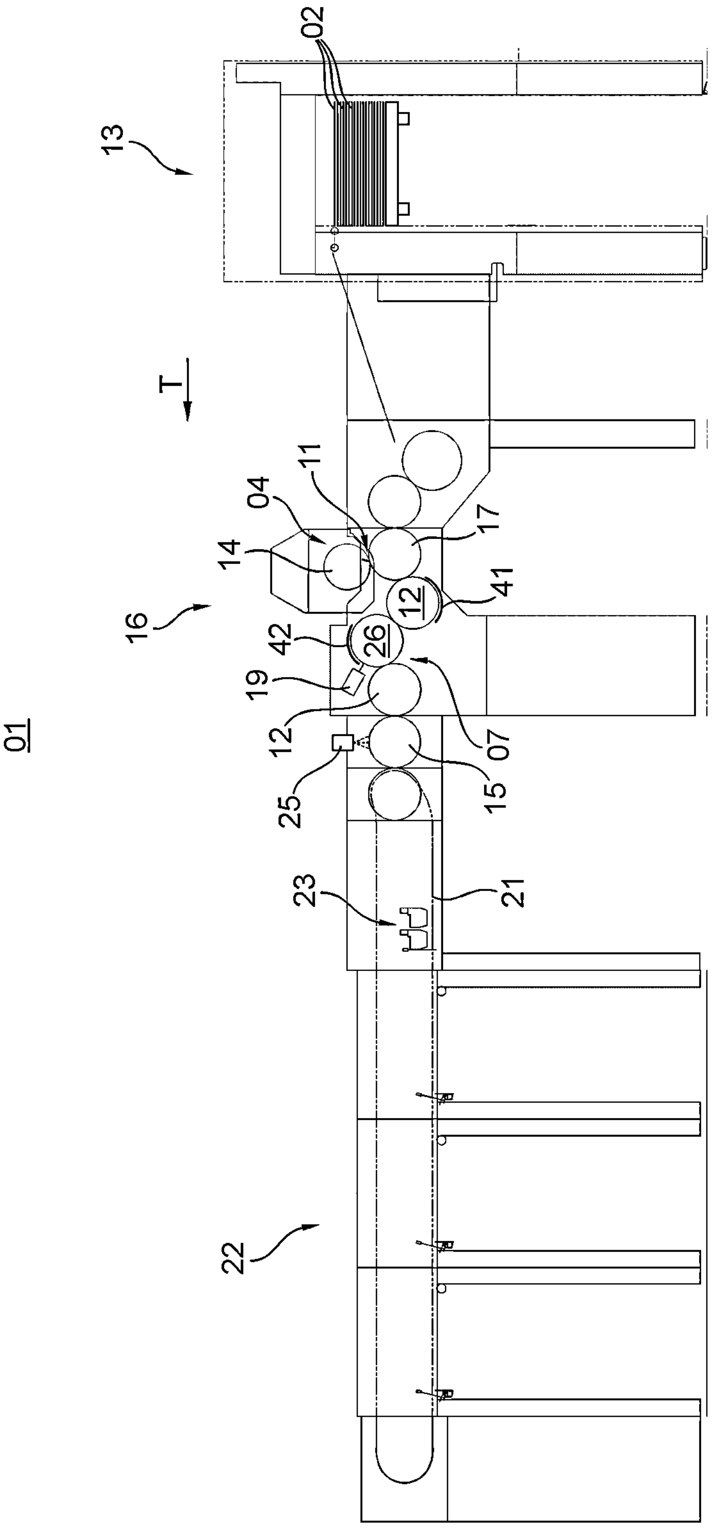
FIG. 1 an exemplary embodiment of a machine, for example securities printing machine, for generating optically variable image elements on a substrate.

A machine 01, in particular a securities machine 01, for example a printing machine 01, in particular a securities printing machine 01, treating and/or processing web-format or in particular sheet-format substrate 02, preferably for generating optically variable image elements 03 on a substrate 02, for example an in particular sheet-format printing substrate 02, comprises, for example, an application device 04, for example a printing mechanism 04, by which an optically variable coating agent 06, for example optically variable printing ink 06 or varnish 06, can be applied at at least one application point, for example printing nip, to at least a first side of the substrate 02, for example of the printing substrate 02, across the entire surface area or in partial regions in the form of print image elements 08, and, in the case of a machine 01 for generating optically variable image elements 03, a device 07 for aligning particles P that are contained in the optically variable coating agent 06 applied to the substrate 02 and that are responsible for the optical variability (see, for example, FIG. 1). This device 07 is also referred to as an alignment device 07 for short or, since it produces an image of the optically variable pattern or motif as a result of a defined alignment of the particles P, is also referred to as an image-producing alignment device 07. An application of coating agent 06 that contains particles P and a subsequent image-producing alignment are schematically shown, for example, in FIG. 2 on the left side (FIG. 2*a*)) based on the illustration of the numeral I by way of the alignment of previously randomly oriented particles P. The Roman numeral I denotes a state I in which the coating agent 06 has been applied and is present in randomly oriented form, and numeral III denotes a state III in which an image-producing alignment has taken place.

The print image elements 08 made up of variable coating agent 06 which are applied onto the substrate 02 by the application device 04 prior to the treatment by the alignment device 07 can correspond to the optically variable image elements 03 to be generated in terms of size and position, or possibly may also be larger than these, and possibly can even extend across the surface area of several multiple-ups 09. In the case of larger print image elements 08, for example, an optically variable image element 03 is not generated by alignment on the entire surface area that is coated with optically variable coating agent 06.

The particles P responsible for the optical variability contained here in the coating agent 06, for example the printing ink 06 or the varnish 06, are magnetic or magnetizable, non-spherical particles P, for example pigment particles P, hereafter also referred to as magnetic flakes for short.

The machine 01 is preferably designed to produce multiple-ups 09, for example securities 09, and in particular bank notes 09. This shall in particular also cover the production of intermediate securities products, for example the production of printing substrate 02, in particular in the form of web-format or sheet-format printing substrate sections 02, in particular printing substrate sheets 02, using print images of multiple securities 09. The substrate 02 can be formed by, for example cellulose-based or preferably cotton fiber-based, or at least cellulose-containing or preferably cotton fiber-containing, paper, by plastic polymer or by a hybrid product thereof. It may be present uncoated prior to being coated in the above-described application device 04, or may already have been coated, or it may be unprinted or already have been printed once or multiple times in one or more upstream processes, or may have been mechanically processed in another manner. Preferably, several multiple-ups 09, for example bank notes 09 to be produced or the print images thereof, are arranged on a printing substrate section 02 that is formed by a longitudinal section of web-format substrates 02 or by a sheet of a sheet-format substrate 02 in a matrix-like manner, next to one another in rows extending transversely to the transport direction T and one behind the other in columns extending in the transport direction T, or are to be arranged during the course of the processing operation of the substrate 02 (indicated, for example, in FIG. 2).

The machine 01 designed as a printing machine 01 can generally comprise one or more printing mechanisms 04 of arbitrary printing methods. For the sake of simplicity, however, in the embodiment illustrated here it comprises a printing mechanism 04, in particular a printing mechanism 04 operating according to the flexographic printing method, or preferably according to the screen printing method, by which the optically variable coating agent 06 is or can be applied onto a first side of the printing substrate 02. A greater film thickness, compared to other printing methods, can be applied, for example, by the described printing methods, in particular the screen printing method.

The expression of the "first side" of the substrate 02 or printing substrate 02 is selected arbitrarily and is intended here to denote the side of the printing substrate 02 onto which optically variable coating agent 06 to be treated downstream by the alignment device 07 is or was or can be applied.

In the illustrated and preferred embodiment, the printing machine 01 comprises a substrate infeed 13, preferably designed as a sheet feeder 13, from which the substrate 02 designed, for example, as a sheet-format printing substrate 02, is or can be fed, possibly via further printing or processing units, to the at least one printing mechanism 04, for example flexographic or preferably screen printing mechanism 04, applying the optically variable coating agent 06, which forms a printing nip 11 for printing, for example, a first side of the printing substrate 02 between a printing mechanism cylinder 14, in particular a forme cylinder 14, for example a screen printing cylinder 14, and a shared cylinder 17, for example an impression cylinder 17.

The printing mechanism 04 preferably comprises a forme cylinder 14, serving as the image-producing cylinder, including a multiplicity of, in particular like and/or identical, image-producing printing elements, hereafter also referred to as print motifs or, in particular like and/or identical, groups of image-producing printing elements or print motifs around the circumference, which, on a circumferential length corresponding to the print image length, are arranged in a matrix-liked manner in multiple, for example a number of, for example, four to eight, in particular five to seven, for example six, columns that are spaced apart from one another transversely to the transport direction T and, on a cylinder width corresponding to the print image width, in multiple rows that are spaced apart from one another in the transport direction T. In the case of a printing mechanism 04 operating according to the flexographic printing method, these print motifs are designed in the manner of letterpress print reliefs, and in the preferred case of a printing mechanism 04 operating according to the screen printing method, they are designed in the manner of screen printing stencils.

The printing substrate 02 can be fed from the printing mechanism 04 applying the optically variable coating agent 06 to the alignment device 07 via conveying means, for example one or more conveying devices 12 designed as cylinders 12, for example as transport cylinders 12. In the case of a web-format printing substrate 02, the conveying means could be formed by one or more positively driven and/or non-driven rollers.

After passing through the alignment device 07, which is described in detail below, the printing substrate 02 can be fed to a further conveying device 21 directly or via further conveying means, for example further transport cylinders 12, and can be fed thereby to a product receiving system 22 for receiving the printing substrate 02 treated and/or processed in the machine 01, and in the case of sheet-format printing substrate 02 can be fed to a pile delivery 22. For the preferred case of sheet-format printing substrate 02, sheet-conveying means, for example one or more transfer cylinders or drums, or, as illustrated here, a conveying device 21 configured, for example, as a revolving gripper conveyor 21, in particular a so-called chain gripper system 21, are provided as conveying means, which receive the printing substrate sheets 02 from the transport path section of the alignment device 07 via possibly one or more further transport cylinders and, for example, feed these to the pile delivery 22.

At least one drying device comprising one or more dryers 23, for example radiation dryers 23, directed at the first side of the printing substrate 02, and possibly a cooling unit (not shown), for example a cooling roller, can be provided at the transport path leading away from the alignment device 07. In a refinement, an inspection device 15, 25, for example a sensor device 25, for example a camera 25, in particular a line scan camera 25, cooperating with a transport cylinder 15, in particular an inspection cylinder 15 designed as a kind of suction drum 15, can be provided on the transport path between the alignment device 07 and the pile delivery 22.

In an advantageous refinement, the printing mechanism 04 and the alignment device 07 can be structurally combined, for example in the manner of a module, to form a device 16 for generating optically variable image elements. In a refinement, such a module can, for example, be provided several times in a row in the machine 01. In the advantageous configuration in the manner of a module, the device 16 is or can be inserted into the transport path of the machine 01 to be fitted therewith using input-side and output-side interfaces corresponding to interfaces of a conveyor system, which continues upstream and downstream. In an advantageous refinement of the machine, two or even more such devices 16 are provided, in particular in the form of modules.

Even though the alignment device 07 described hereafter in detail is essentially arbitrary in terms of the designs, embodiment variants, or configurations thereof, it is preferably provided or can be provided in an above-described machine 01 or printing machine 01.

The alignment device 07 for creating optically variable image elements 03, for example for creating the optically variable effect in the optically variable coating agent 06 applied previously, for example in the form of print image elements 08, onto the substrate 02, in particular onto the printing substrate 02, has a defined transport path along which the substrate 02 to be conveyed through the alignment device 07 is fed or can be fed from an entrance area, in which the substrate 02 to be treated and comprising, on the first side thereof, an optically variable coating agent 06, is brought or can be brought into operative connection in a defined manner with an alignment device 26 that comprises elements 24 providing magnetic fields, magnetic elements 24 for short, serving as operative elements 24, preferably in such a way that the magnetic elements 24 of the alignment device 26, which serve image-producing orientation purposes, and the printing substrate 02 printed with the printing ink 06 containing the particles P move synchronously with respect to one another, at least on a section of the transport path. The alignment device 26 is configured as a magnetically active cylinder 26 here, magnetic cylinder 26 for short, which around the circumference comprises the arrangement of magnetic elements 24 and via which the printing substrate 02 is guided or conveyed, starting from an entrance area, in the direction of an exit area of the alignment device 07. It is rotatably mounted on both sides in a one-piece or multi-piece frame.

Figure 3:
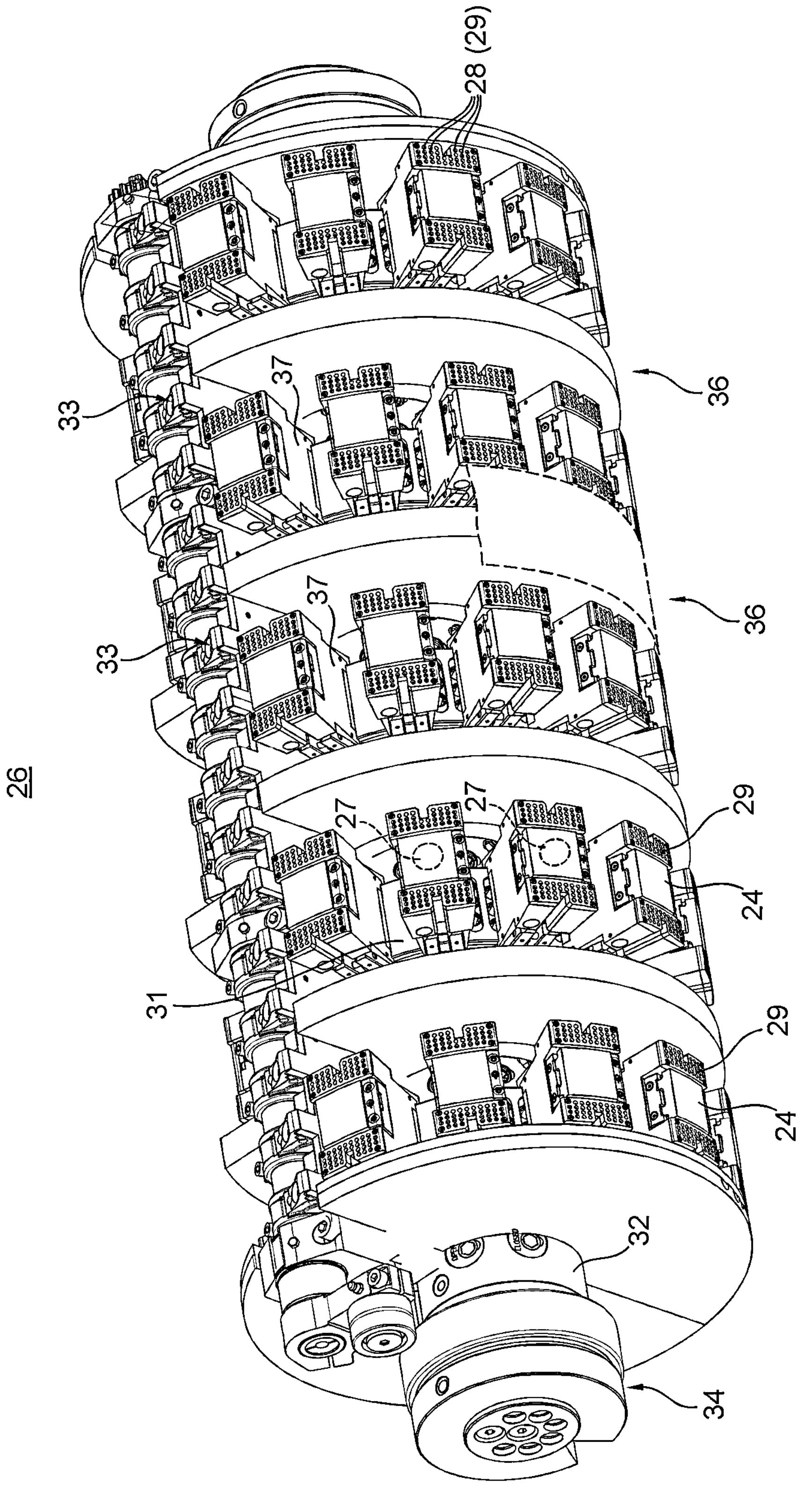
FIG. 3 an oblique view of a design for a magnetic cylinder.
Figure 4:
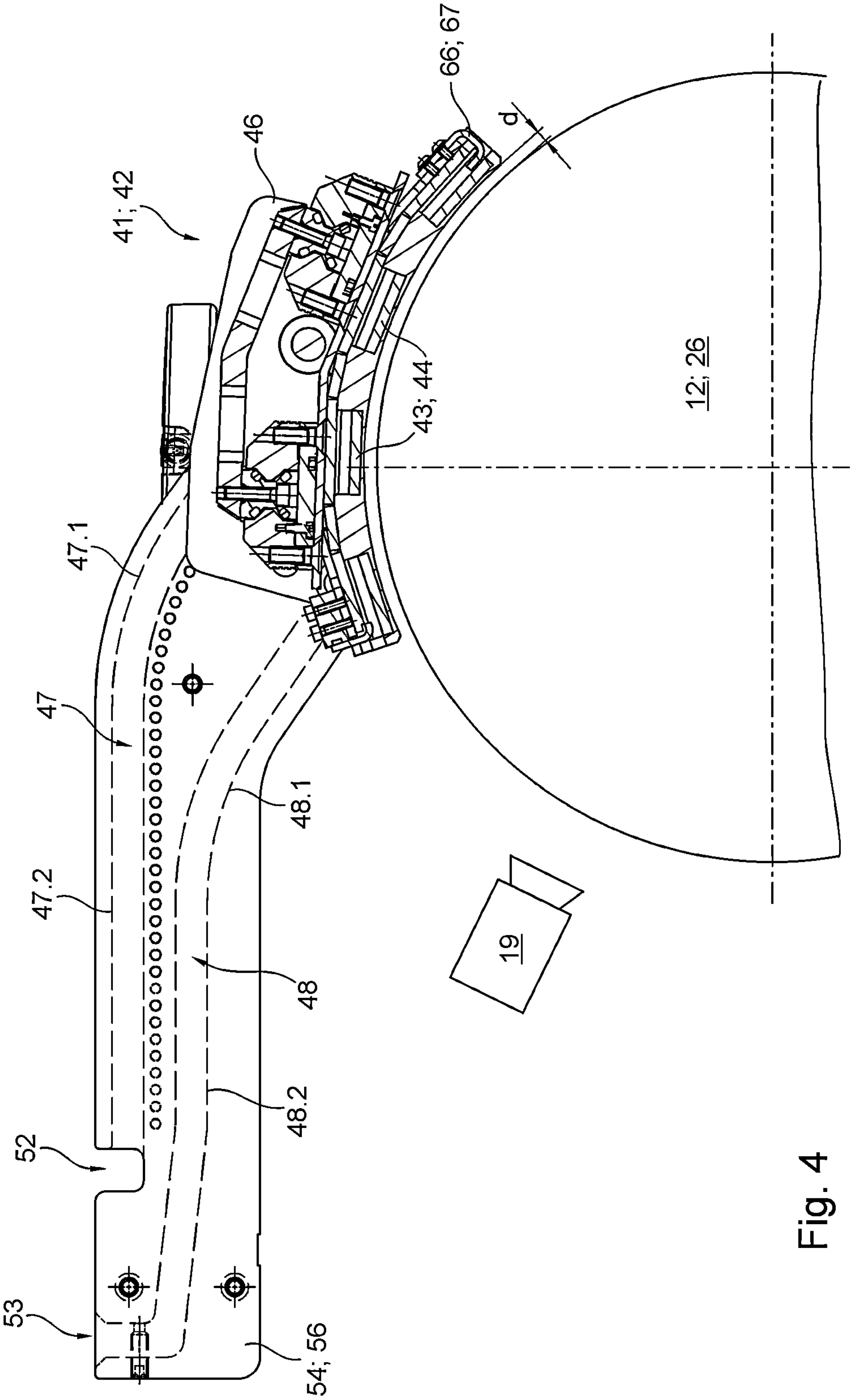
FIG. 4 a sectional view of a cylinder with a cooperating alignment device.
Figure 5:
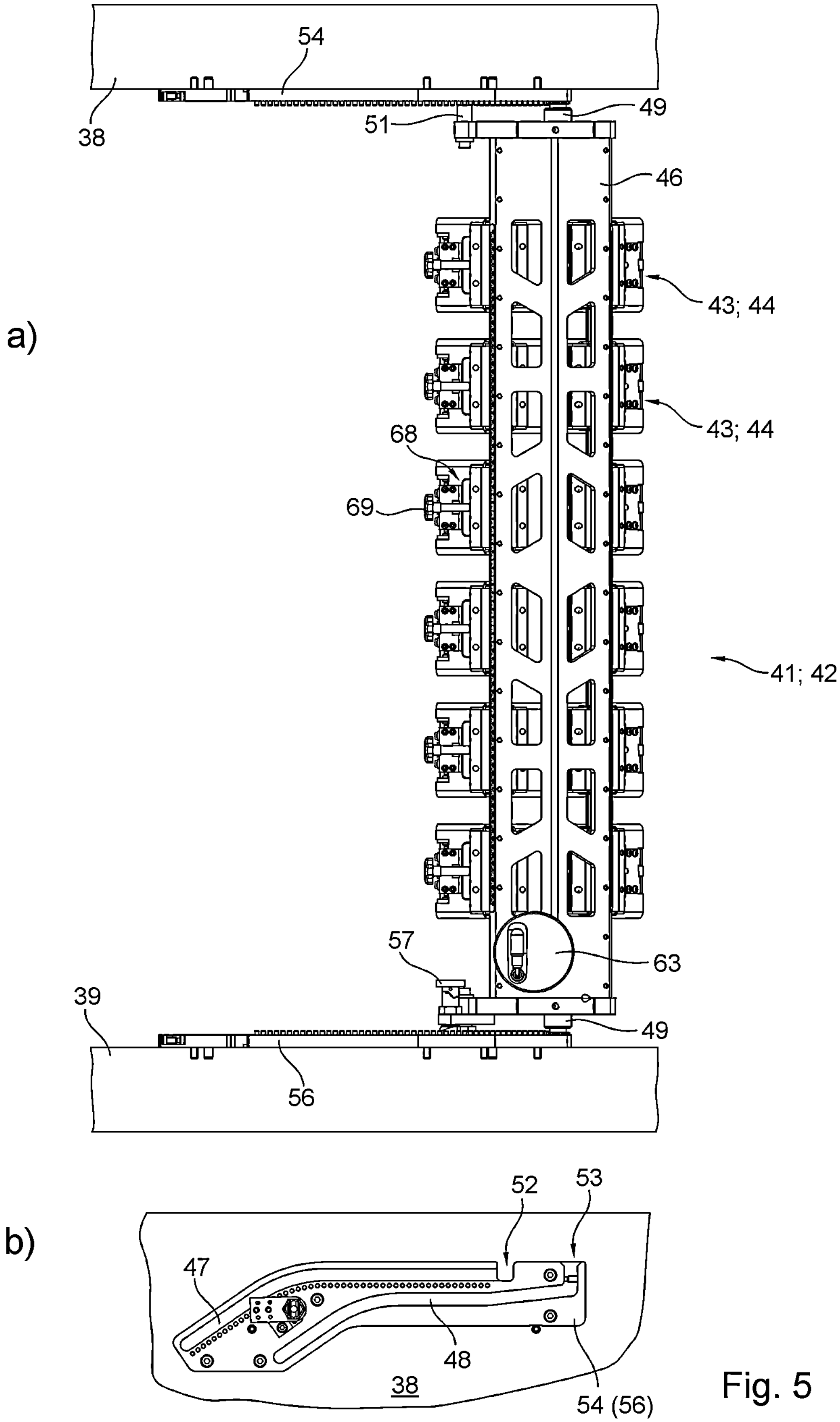
FIG. 5 a top view a) of an alignment device arranged at a frame as well as a lateral view b) of a side panel for receiving the alignment device from the inside.
Figure 6:
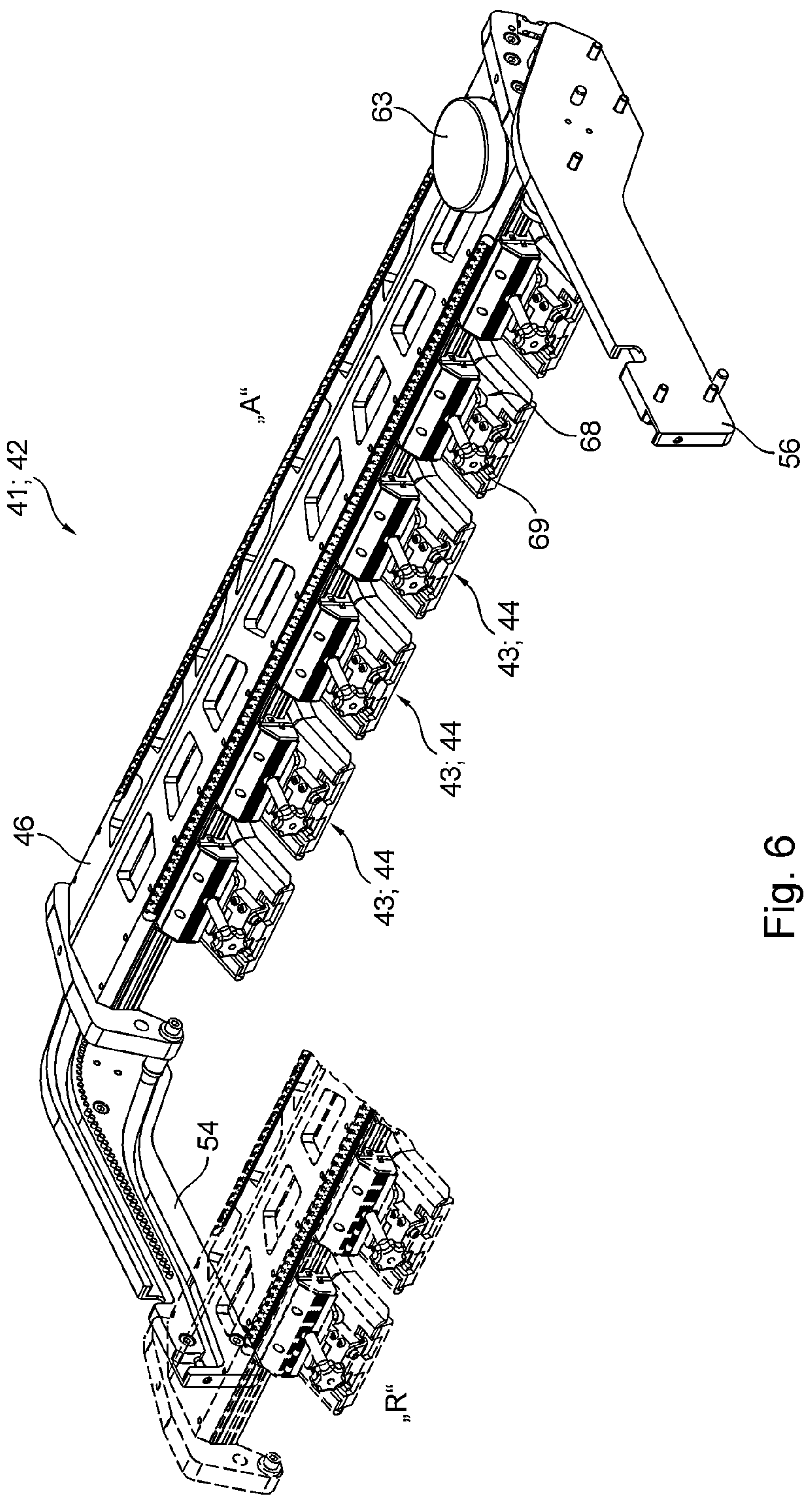
FIG. 6 an oblique view of an alignment device held in side panels.
Figure 7:
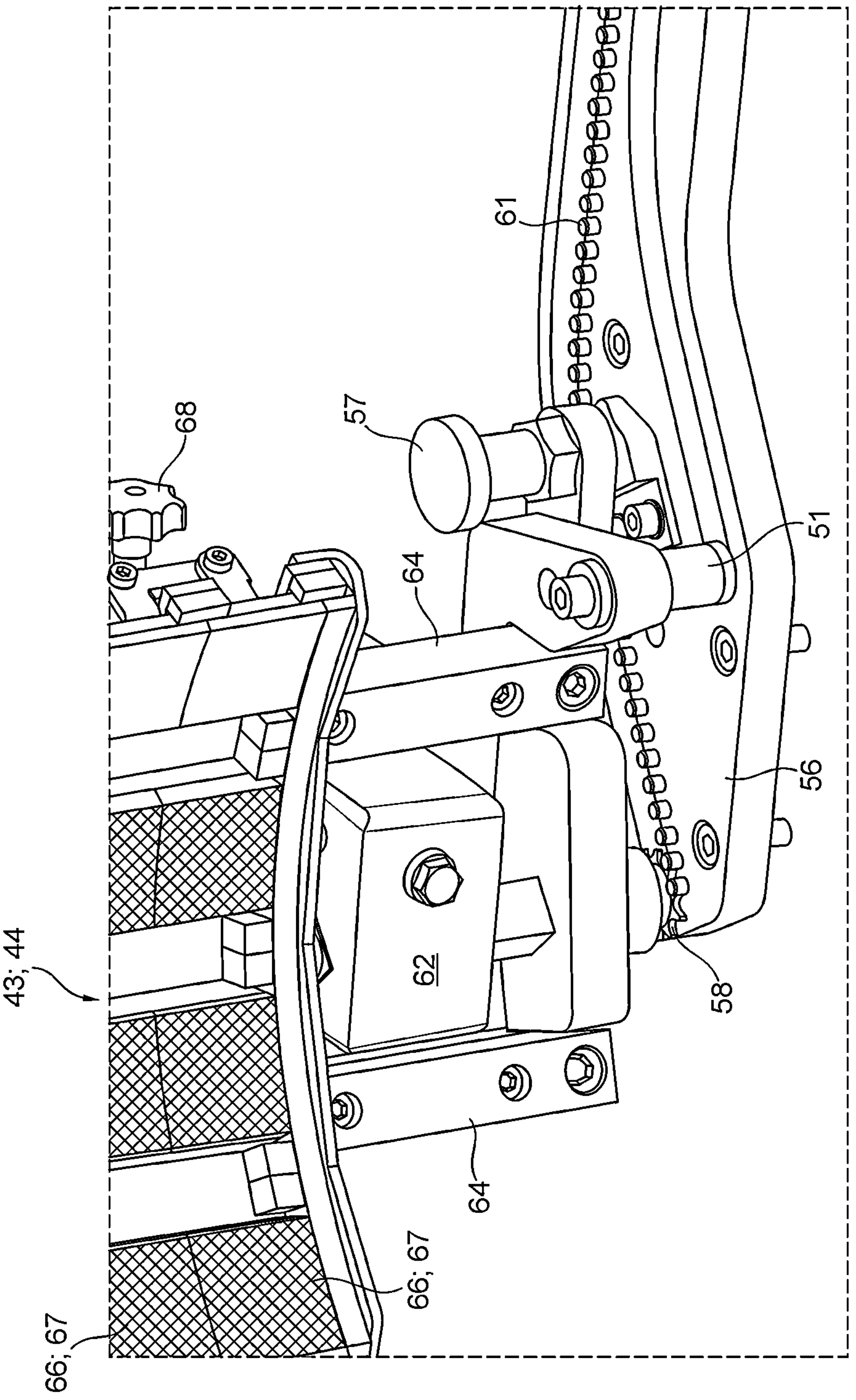
FIG. 7 a perspective partial view from beneath of a connection of the alignment device to a side panel including guides.

The magnetic elements 24 can be formed directly by one-piece or multi-piece magnets themselves, which are indicated with dotted lines by way of example in FIG. 3, or can preferably comprise one or more magnets 27, which are arranged, preferably detachably, in or at a mount 28, for example on or in a base. Here, in general, magnets 27 shall be understood to mean magnetically active devices that, permanently or switchably, at least toward the side of the transport path, induce a magnetic field, which is sufficiently strong, in particular for aligning particles P contained in the coating agent 06 on the substrate 02 being guided over the same, as described here. The magnets 27 can be formed by one or more permanent magnets with or without engraving, by solenoids, or by combinations of one or more permanent magnets and/or one or more solenoids. Regardless of whether a single magnet or a combination of multiple magnets, for example permanent magnets and/or solenoids, is involved, the term 'magnet' 27 hereafter shall also be understood to mean multiple magnets 24 that are assigned to the same magnetic element 27 and, in their entirety, form a magnetic unit, unless explicitly expressed otherwise. The magnetic element 24 shall also be understood to include embodiments comprising multiple one-piece or multi-piece magnets 27 that are encompassed by the magnetic element 24 and spaced apart from one another, as they may be employed, for example, if the same multiple-up 09 is to be acted upon by a respective magnetic field at two different points. Such a magnet 27 or such an arrangement of multiple magnets 27 of the same magnetic element 24 can be accommodated in a housing of the magnetic elements 24, which, for example, is detachably arranged in or on a mount.

Generally, it is also possible for two such magnetic cylinders 26 to be provided in the transport path, which are arranged on the same side, or on different sides, of a substrate 02 to be conveyed along the transport path.

In an advantageous embodiment, a drying and/or curing device 19, for example a radiation dryer 19, in particular a UV radiation dryer 19, UV dryer 19 for short, is assigned to the image-producing alignment device 07, which is preferably configured as a UV LED dryer 19 and/or is directed at a point in the transport path at which the substrate 02 cooperates with the magnetic cylinder 26.

In a particularly advantageous embodiment, the drying and/or curing device 19 is arranged around the circumference of the magnetic cylinder 26 and/or directed at a circumferential section of the relevant magnetic cylinder 26 located in the transport path.

The magnetic cylinder or one of the magnetic cylinders 26 is arranged in the transport path of the substrate 02 to be conveyed, preferably on the second side thereof, so as to point outwardly with the first side, which is coated in particular upstream inline with optically variable coating agent 06, while passing the magnetic cylinder 26, in particular while being transported over the magnetic cylinder 26.

The magnetic cylinder 26 comprises a one-piece, or preferably a multi-piece, cylinder body 29 at or on which the magnetic elements 24 are, preferably detachably, arranged. The one-piece, or preferably multi-piece, cylinder body can be or is rotatably mounted in a frame. The term of the cylinder body shall denote the part of the unloaded cylinder 29 and can encompass both closed structures, that is, having a substantially closed outer cylinder surface, and open structures, that is, scaffolding-like or frame-like structures, such as the example illustrated with regard to FIG. 3.

The magnetic cylinder 26 comprises the plurality of magnetic elements 24 in the region of the side facing the substrate path, for example, in the region of the outer circumference, in particular in the region of an outer cylindrical shell surface of the cylinder body, which are used to orient at least a part of the magnetic or magnetizable particles P of the coating agent 06 applied onto the passing printing substrate 02.

In particular for the case of a plurality of multiple-ups 09 per substrate section, for example per printing substrate sheet or substrate sheet 02, which is preferred and described here, viewed in the axial direction, multiple columns or groups, in particular a number m (m0]>1) of columns or groups corresponding to the number of columns on the printing substrate section 02, each comprising multiple rows, in particular a number n (n0]>1) of axially parallel extending rows corresponding to the number of rows of multiple-ups 09 on the printing substrate section 02 to be treated, or, viewed in the transport direction T of the substrate 02 and/or in the circumferential direction of the cylinder 26, magnetic elements 24 arranged in a column or group one behind the other are provided or arranged in a matrix-like manner at the cylinder 26, that is, a number of n×m, in words n times m, where n, m0], magnetic elements 24 are provided in a matrix-like manner around the outer circumference.

By guiding the substrate 02 over a magnetic cylinder 26 configured in this way, wherein, for example, the first substrate side points outwardly when transported over the first cylinder 26, it is possible to cause particles P to be aligned or oriented in the region of the image elements 03 provided on the multiple-ups 09 by means of the magnetic elements 24, that is, here, for example, through the substrate 02.

The number m of the columns or groups is, for example, four to eight, in particular five to seven, for example six, and/or the number n of the magnetic elements 24 of a column or group is, for example, two to twelve, advantageously five to ten. The magnetic cylinder 26 or the cylinder body thereof is preferably configured in such a way that the number m of columns or groups and/or the number n of rows or of magnetic elements 24 arranged one behind the other in a column or group can be varied, for example within the above-described boundaries, so as to adapt these to different requirements.

Preferably, the magnetic elements 24 are arranged or can be arranged detachably at the cylinder 26, preferably in or at a corresponding mount together with the magnetic elements, in such a way that they, in the mounted state, can be arranged at a defined location around the circumference of the cylinder 26 and can preferably be completely removed from the cylinder 26 and/or can be positioned around the circumference of the cylinder 26 in the axial and/or circumferential directions.

For an above-described matrix-like arrangement, magnetic elements 24 can be arranged and mounted at or in a cylinder 29 so as to be mounted at the one-piece or multi-piece cylinder body variably in their axial position relative thereto, at least relative to other magnetic elements 24 of the same column or group of magnetic elements 24. This can be implemented, for example, via axially extending guides around the circumference of the cylinder body, in or on which the relevant magnetic elements 24 are directly or indirectly mounted and can be moved into different axial positions. Such guides could generally be provided individually for individual magnetic elements 24 of a row, but possibly also continuously for multiple or all magnetic elements 24 of the same row. In this case, the guides could be provided on above-described axially extending carrier elements, which carry all magnetic elements 24 of the same row.

In the preferred case of columns that are combined into groups, the magnetic elements 24 can be arranged or arrangeable, directly or indirectly, in or at multiple, for example a number m of, for example, four to eight, in particular five to seven, for example six, preferably ring-like carrier elements 31, for example ring elements 31 here, which are axially spaced apart from one another and preferably an above-described part of which, or preferably all of which, can be positioned in the axial direction on a cylinder body 32, in particular an axially extending cylinder shaft 32, shaft 32 for short, wherein in turn in each case multiple, for example two to twelve, advantageously five to ten, magnetic elements 24 are arranged or can be arranged one behind the other in the circumferential direction in or at these ring elements 31 and at least some of which, or all of which, are arranged or can be arranged so as to be positionable in the circumferential direction (see, for example, FIG. 3).

For the case of a web-format substrate 02, the magnetic cylinder 26 can be designed without any holding means acting on the substrate 02 and, for example, with ring elements 31 that are closed in the circumferential direction. For the case of sheet-format substrate 02 preferred here, holding means 33, for example grippers 33 of a so-called gripper bar, are provided around the circumference of the cylinder 26, by which a substrate sheet 02 to be conveyed over the cylinder 26 can be picked up at the leading end thereof, and can be held or is held during a rotation of the cylinder 26 over a rotation angle range. A magnetic cylinder 26 configured in this way at the same time serves to transport the substrate 02. For example, the ring elements 31 are, for example as is apparent in FIG. 3, interrupted in the circumferential direction to receive the holding means 33. Unless an explicit distinction is made, the term "ring-like" carrier elements or "ring elements" here shall also include non-closed, that is, ring segment-like, elements.

In a particularly advantageous embodiment of the magnetic cylinder 26, suction openings 28 are provided in the region of the envelope, via which suction can be applied to substrate sheets 02 transported on the cylinder 26 to be pulled against the circumferential surface. These can generally be provided in suction channels extending between the groups of magnetic elements 24 or, as is illustrated, in the suction elements assigned to the magnetic elements 24. The suction openings 28 can have a line connection to a suction air source or compressed air sink via rotary feedthroughs 34 provided, preferably on both sides, at the end face of the shaft 32 so as to apply vacuum pressure.

In a refinement of the cylinder 26, a respective support element 36 can be provided in each case between two columns or groups of magnetic elements 24, which has a support surface to support substrate 02 conveyed over the cylinder 26 at the level of the cylinder envelope. The latter can be formed by the circumferential surface of a support element 36 itself, designed as a support ring, or by a support plate provided on such a support ring.

In an advantageous embodiment of the magnetic cylinder 26, for example the one illustrated, the magnetic elements 24 are arranged on magnetic element carriers 38, which in turn are arranged, and preferably can be positioned in the circumferential direction, in groups on above-described ring elements 31, which can preferably be axially positioned on the shaft 32. In particular, the magnetic elements 24 can be provided together with one or more assigned suction elements 29 at such a magnetic element carrier 38 and form a modular unit, which can, for example, be positioned in the circumferential direction on the ring element 31.

As was already described above, the particles P applied to the substrate 02, for example at least in a surface area relevant for the image or motif to be represented, can be aligned by an above-described alignment device 26 that is provided for the image-producing alignment, in particular an above-described magnetic cylinder 26.

In addition to the image-producing alignment device 26 or the magnetic cylinder 26, which cooperates with particles P contained in the coating agent 06 in such a way that the magnetic elements 24 and the substrate 02 containing the particles P are or can be moved synchronously with one another on a part of the transport path, at least one further alignment device 41; 42 is provided, which, during regular operation, that is, during production operation, comprises one or more magnetic elements 43; 44 that are fixed to the frame, that is, arranged at the transport path in a stationary manner, which enter into or can enter into magnetic interaction with magnetic or magnetizable particle P on the substrate 02 to be guided past the device along the transport path.

During normal operation, the further alignment device 41; 42 is arranged at a point of the transport path that is located opposite a cylinder circumferential section, located in the transport path, of a cylinder 12; 26 transporting the substrate 02, that is, around the circumference of a cylinder 12; 26 and located opposite the transport path of the outer cylindrical surface. During operation, this forms a gap between the magnetic element or elements 43; 44 and the outer cylindrical surface, for example a gap having a width d ranging between 3 and 10 mm, in particular between 4 and 7 mm, for the substrate 02 to pass through.

The further alignment device 41; 42, which is stationary during normal operation, comprises a one-piece or multi-piece carrier 46, which carries the magnetic element or elements 43; 44 and which is mounted, on both sides, so as to be able to vary the position thereof in frame walls 38; 39 of a frame, for example a frame part receiving the alignment device 41; 42, so that the magnetic elements 43; 44 carried thereby can be moved between a position A, for example a working position A, in which the magnetic elements 43; 44 are in an operating position, and a makeready or inactive position R, in which the magnetic elements 43; 44 are located at a larger distance with respect to the transport path compared to the working position A and/or in which the magnetic elements 43; 44 and/or a transport path section to which access is impeded by the magnetic elements 43; 44 in the working position A is better accessible.

For this purpose, the carrier 46 carrying the magnetic elements 43; 44 of this further alignment device 41; 42 is thus mounted, on both sides, in or at at least a respective guide 47; 48, in or at which the carrier 46, together with the magnetic elements 43; 44, can be moved along a movement path from the working position A into the makeready position, and vice versa. In contrast to, for example, a pivoting motion at levers about a fixed pivot axis, the movement or movability along the movement path is, for example, a translatory movement, in particular a translatory movement overall, that is, all components of the movable carrier 46 between a respective working position A and makeready position. The movement path predefined by the guides 47; 48 for the movement of the carrier 46 preferably extends in a plane that is perpendicular to the axis of rotation of the cylinder 12; 26 and/or can include one or more linear and/or curved guide sections 47.1; 47.2; 48.1; 48.2.

In an advantageous embodiment of the guides 47; 48, in which the carrier 46 is, for example, to be guided past a further machine component arranged at the same cylinder 12; 26, for example a drying and/or curing device 19, the guides are configured with guide sections 47.1, 47.2, 48.1, 48.2 so as to initially be led, from the working position A, away from the cylinder 12; 26 with a radial directional component, which, for example, is greater compared to the tangential component, and then be moved away from the cylinder 12; 26 with a radial directional component which is smaller compared thereto and/or a tangential directional component which is greater compared to the radial component, to improve the accessibility.

In the simplest case, the particular guide 47; 48 can be formed by a one-sided bearing surface, on which a carrier-side support element 49; 51 is supported, for example, in the design as a stud 49; 51 or as a roller 49; 51 and on which this element can be displaced along the movement path. Preferably, however, the guide is designed in the manner of a guide groove 47; 48, in which the carrier-side support element 49; 51, for example in the design as a stud 49; 51 or as a roller 49; 51, is supported, for example, on one side by a bearing surface and on the other side, at least on the stretch between the position that is assumed in the working position A and a position that is possibly provided for a complete removal, is secured by a further surface to prevent tilting or inadvertent disengagement. In a position that is assumed by the support element 49; 51 in the working position A toward the point of the particular guide 47; 48 that is spaced apart from the makeready position R, in particular in the region of the other end thereof, an opening 52; 53, for example in the manner of an exit 52; 53 from the guide groove 47; 48, can be provided in the guide 47; 48 configured as a guide groove 47; 48, through which the particular support element 49; 51 can exit or be guided out of the relevant guide groove 47; 48 in the removal position. It is possible to remove the carrier 46 through such openings 52; 53.

In an embodiment that is to be preferred, two such guides 47; 48 are provided at each end face of the carrier 46 to be guided, which each, for example, cooperate with a carrier-side support element 49; 51. The carrier-side support elements 49; 51 are provided spaced apart from one another at the carrier 46, so that, in particular in the case of guide grooves 47; 48, a tilting of the carrier 46 about an axis that is parallel to the axis of rotation of the cylinder 12; 26 is prevented.

The guides 47; 48 can be provided directly in the frame walls 38; 39 of the frame carrying the alignment device 41; 42, for example on the side thereof pointing inwardly. In an advantageous embodiment, however, these are provided in or at side parts 54; 56, in particular side panels 54; 56, which in turn are, for example detachably, arranged at the frame walls 38; 39. Depending on the arrangement of the alignment device 41; 42 and the spatial conditions, such side panels 54; 56 can be individually configured with guides 47; 48, without specifically having to intervene in possibly existing standard frame designs.

So as to hold the carrier 46 in the working position A securely and in a positionally accurate manner, a fixing device or locking device 57, for example a spring-preloaded stud 57, can be provided at the carrier 46 in an advantageous refinement, which engages in an opening at the frame or a side panel 54; 56 when the working position A of the carrier 46 has been correctly assumed.

The movement of the carrier 46 in or at the guides 47; 48 between the various positions A; R can generally be carried out in any arbitrary manner, however here, in an advantageous embodiment, is implemented by a gear wheel-based linear drive 58; 59. The gear wheel 58 engages in a corresponding gear pattern 59 extending along the stretch to be covered. This gear pattern 59 can be formed by a toothed rack 59, the shape of which may be adapted to the guide profile, or, as is illustrated here, by a tooth row 59, in the form of studs 61 individually arranged in the side 56 along the guide profile, which is provided in the side panel 56 of at least one side.

The gear wheel 58 can preferably be driven by way of a, preferably self-locking, gear mechanism 62, for example a worm gear. For example, on the drive side, as is illustrated here, the latter can be actuated, for example, manually, for example by way of a hand wheel 63 or, in a more comfortable embodiment, by way of a driving motor.

The magnetic elements 43; 44 of the further alignment device 41; 42 can be formed by individual magnets, or by a group of multiple individual magnets, and be accommodated individually or as a group on a magnet carrier 66; 67. The individual magnets can be formed by permanent magnets or solenoids. If multiple magnetic elements 43; 44 are present, these are arranged transversely to the transport direction T, spaced apart from and next to one another, in particular in a distribution that corresponds to the pattern of the arrangement of the columns of multiple-ups 09 arranged on the substrate 02.

The alignment device 41; 42, which is stationary during normal operation, preferably comprises, transversely to the transport direction T, a plurality, for example between four and eight, in particular between five and seven, for example six, magnetic elements 43; 44 that are spaced apart from one another transversely to the transport direction T.

In a particularly advantageous embodiment, for example with respect to high product variability, the magnetic elements 43; 44 of the further alignment device 41; 42 or the magnetic carriers 66; 77 thereof are arranged at the carrier 46 so as to be movable or adjustable transversely to the transport direction T.

For this purpose, the magnetic elements 43; 44 of the further alignment device 41; 42 or the magnetic carriers 66; 67 receiving the magnets are, for example, mounted so as to be transversely movable at one or more cross members 64 encompassed by the carrier 46. They can be fixable in a desired position, for example by way of a knob 69, by a holding device 68 configured, for example, as a clamping mechanism 68.

So as to be able to carry out adaptations through replacement and/or be able to achieve an operation in a simple manner without an additional alignment, the magnetic elements 43; 44 of the alignment device 41; 42 are detachably arranged at the carrier 46 or at the relevant magnetic carrier 66; 67 and/or the magnetic carriers 66; 67 are detachably arranged at the carrier 46. As described, instead or preferably in addition, the carrier 46, including the magnetic elements 43; 44, can be arranged so as to be removable overall from the frame for this purpose.

Even though the magnetic elements 43; 44 of the further alignment device 41; 42 could generally also be arranged at a linear transport path section and could have a shape that is elongated in the transport direction T and planar, at least on the side facing the transport path, the magnetic elements 43; 44 thus movable in guides 47; 48 are preferably arranged at a curved transport path section, for example an above-described cylinder 12; 26, and have a curved shape that is elongated along the transport path, in particular a curved circular segment-like shape, at least on the side facing the transport path.

In a particularly advantageous embodiment, such a further alignment device 41 in the transport path of the substrate 02 to be conveyed is configured as a further alignment device 41 used for pre-orientation, a pre-alignment device 41 for short, and is, for example, arranged upstream in the transport path from an image-producing alignment device 26, in particular the magnetic cylinder 26. Such an alignment device 41 is arranged upstream from the magnetic cylinder 26 in such a way that a pre-orientation of the particles P can be induced by the magnetic elements 43 thereof in surface areas that are at least adjacent to the image-producing partial regions. In particular, the magnetic elements 43 of this second alignment device 41 are preferably configured and oriented in such a way that the particles P of the surface area passing through the active region thereof are biaxially aligned, parallel to one another, so that a homogeneous optical impression is created across this surface area. In an embodiment to be preferred, the magnetic elements 43 are configured and aligned in such a way that the resulting magnetic fields thereof align the particles P, which, for example, are planar and configured to have a length that is larger compared to the width, in the relevant surface area of the image element 03 with the flat sides thereof parallel to the substrate surface and with the longitudinal extensions thereof all pointing in the same direction.

The pre-alignment device 41, transversely to the transport direction T, preferably comprises one, or preferably multiple, magnetic elements 43 in the above-described manner and is arranged at the transport path so as to, when in the working position A, enter into or being able to enter into magnetic interaction with particles P provided on a substrate 02 to be guided past the same on the transport path.

Preferably, the magnetic elements 43 of the pre-alignment device 41 are provided on the side of the transport path that is located opposite the side on which, in the upstream transport path, most recently a printing operation was carried out or onto which the coating agent 06 was applied. This means, the magnetic elements 43 are preferably provided on the side of the conveyed substrate 02 that was not most recently or freshly printed.

Figure 2:
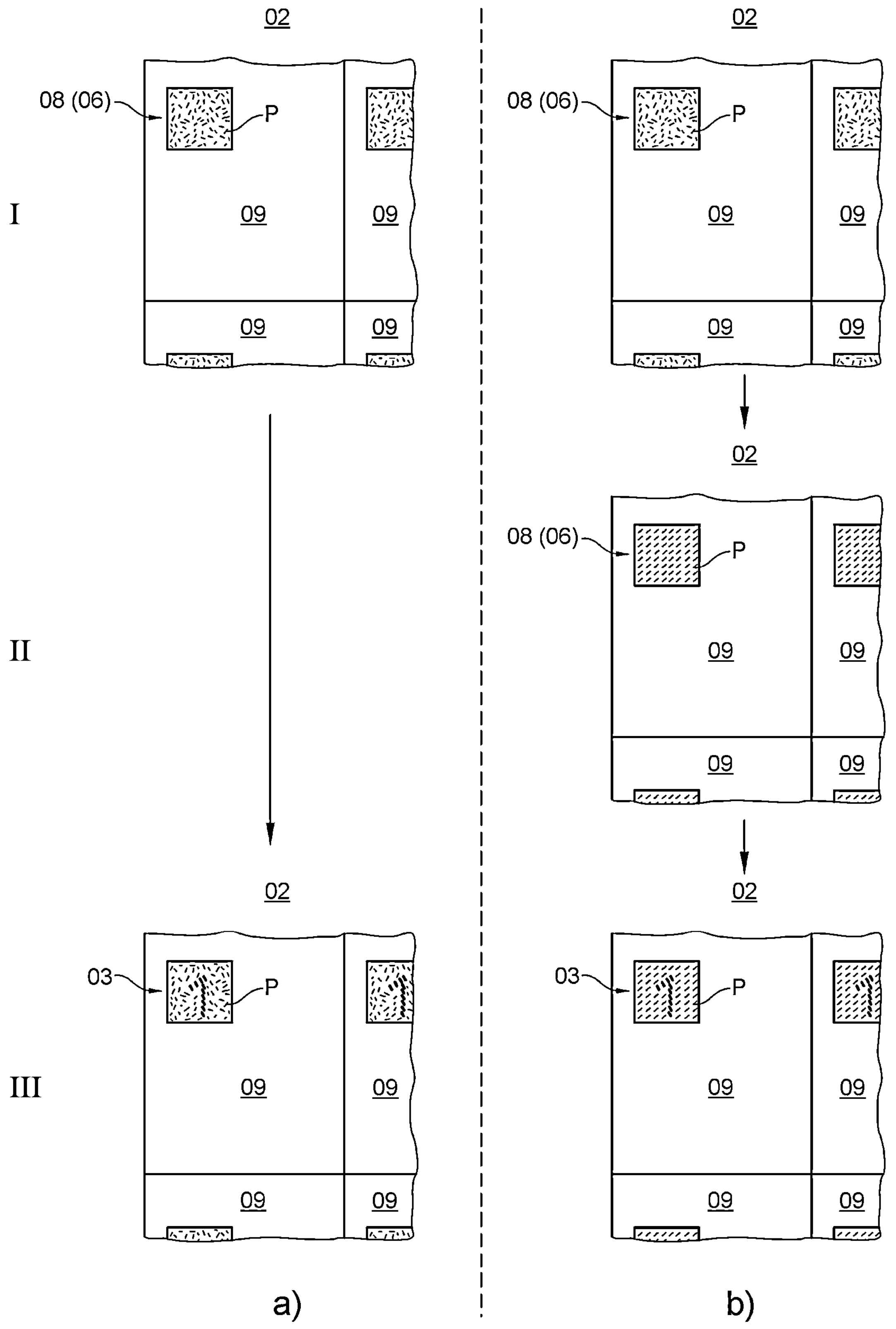
FIG. 2 a schematic illustration of a substrate printed in print elements with an optically variable coating agent, showing on the left side, FIG. 2*a*), an alignment using only the image-producing alignment device, and on the right side, FIG. 2*b*), an alignment using at least one further alignment that induces a pre-orientation.

FIG. 2 on the right side (FIG. 2*b*)) schematically shows the action of such a pre-orientation, wherein the Roman numeral II represents a state II in which the particles P in the coating agent, for example, have already been pre-oriented by the pre-alignment device 41, however an image-producing alignment has not yet taken place or has been disregarded in the illustration. Following the pre-orientation, the previously randomly oriented particles P are organized, for example, parallel or homogeneously in another manner, and thus form a background that provides improved contrast for a pattern or image motif having differently oriented particles P.

In addition to the image-producing alignment by the magnetic cylinder 26, for example, the same and/or adjacent particles located in particular in the surface area that is relevant for the image or motif to be represented, prior to cooperating with the image-producing magnetic cylinder 26 or upstream thereof and/or at least at a point in time or during a time period during the cooperation with the image-producing magnetic cylinder 07, can be oriented with the aid of at least one further alignment device 41 serving pre-orientation purposes or can be acted upon by an additional magnetic force.

In another particularly advantageous embodiment, such a further alignment device 42, serving as an alignment device 42 for simultaneous orientation purposes, a simultaneous alignment device 42 for short, is provided with one or more magnetic elements 44, which is arranged at the transport path, on the side of the transport path located opposite the first alignment device 26, in such a way that identical and/or mutually adjacent surface areas of an identical image element 03, which is to be produced by applying the coating agent onto the substrate 02, at the same time cooperate, at least at one point in the transport path, with the image-producing alignment device 26, in particular the magnetic cylinder 26, which is moved simultaneously with the substrate 02, and with the further alignment devices 42 serving the simultaneous orientation of particles P. In other words, in this embodiment, particles P of an image element 03 are or have been acted upon by an aligning force at at least one point of the transport path by the magnetic field of a magnet 27 of the image-producing alignment device 26, in particular a magnetic element 24 of the magnetic cylinder 26, and, at the same time, the same and/or other particles P of the same image element 03 likewise are or have been acted upon by an aligning magnetic force by the magnetic field of a magnetic element 44 of the further alignment device 42 serving simultaneous orientation purposes.

The simultaneous alignment device 42 is arranged at the transport path with the magnetic elements 44 thereof on the side of the transport path located opposite the image-producing alignment device 26.

As a result of the simultaneous alignment device 42, in addition to the image-producing alignment by the magnetic cylinder 26, for example the same and/or adjacent particles P located in particular in the surface area that is relevant for the image or motif to be represented can thus be oriented, at least at a point in time or during a time period during the cooperation with the image-producing magnetic cylinder 26, with the aid of at least the simultaneous alignment device 42 or can be acted upon by an additional magnetic force.

An above-described machine 01 comprising at least one application device 04 and at least one image-producing alignment device 07, in particular a magnetic cylinder 07, can, for example, comprise only one pre-alignment device 41 arranged upstream from the image-producing alignment device 07, in particular around the circumference of an upstream transport cylinder 12, or can comprise a simultaneous alignment device 42, located opposite the image-producing alignment device 07, in particular the magnetic cylinder 26, in the transport path. In a particularly advantageous embodiment, both a pre-alignment device 41 is arranged upstream from and a simultaneous alignment device 42 is assigned opposite at least one magnetic cylinder 26 encompassed by the machine 01 in the above manner.

In one variant, multiple, for example two, application devices 04 applying coating agent 06 onto the same side of the substrate 02 can be provided in the transport path, between which the substrate 02 is or can be transported over a series of cylinders 12; 26, for example solely by being transferred from cylinder 12; 26 to cylinder 12; 26, wherein at least one of the cylinders 26 provided therebetween is formed by a magnetic cylinder 26. A pre-alignment device 41 can be arranged upstream from and/or a simultaneous alignment device 42 can be assigned opposite the magnetic cylinder 26 in the above manner.

In another variant, instead or in addition, two application devices 04 applying coating agent 06 onto the different sides of the substrate 02 can be provided for this purpose in the transport path, between which the substrate 02 is or can be transported over a series of cylinders 12; 26, for example solely by being transferred from cylinder 12; 26 to cylinder 12; 26, wherein at least one of the cylinders 26 provided therebetween is formed by a magnetic cylinder 26. A pre-alignment device 41 can be arranged upstream from and/or a simultaneous alignment device 42 can be assigned opposite the magnetic cylinder 26 in the above manner.

Figure 8:
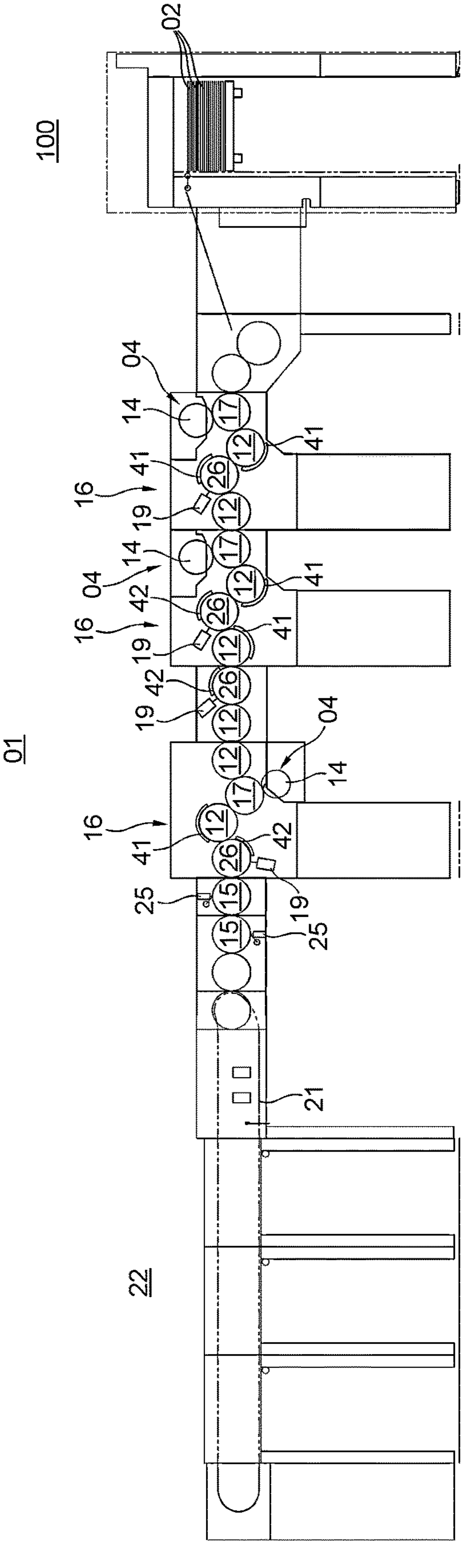
FIG. 8 an exemplary embodiment of a machine, for example securities printing machine, comprising multiple pre-alignment devices and multiple simultaneous alignment devices.

In an exemplary embodiment for an in particular highly flexible machine 01, which is illustrated, for example, in FIG. 8, a first application device 04, applying coating agent 06 onto a first substrate side, and a second application device 04, likewise directed at the first substrate side, are provided, for example. Therebetween, a transport cylinder 12 comprising a pre-alignment device 41, which, for example, is directed at the second substrate side, is provided downstream from the first application device 04 in the transport path, and a magnetic cylinder 26 comprising a simultaneous alignment device 42, which, for example, is directed at the first substrate side, is provided further downstream. Generally, further transport cylinders 12 can be provided between the described cylinders 12; 26. A third application device 04, which is directed at the second substrate side, is provided downstream from the second application device 04, which is likewise directed at the first substrate side. Between the second and third application devices 04, a transport cylinder 12 comprising a second pre-alignment device 41, which, for example, is directed at the second substrate side, is provided downstream from the second application device 04 in the transport path, and a second magnetic cylinder 26 comprising a second simultaneous alignment device 42, which, for example, is directed at the first substrate side, is provided further downstream. A further transport cylinder 12 comprising a further, for example third, pre-alignment device 41, which, for example, is directed at the first substrate side, is provided downstream from the second magnetic cylinder 26, but upstream from the third application device 16, and a third magnetic cylinder 26 comprising a further, for example third, simultaneous alignment device 42, which, for example, is directed at the second substrate side, is provided further downstream. A transport cylinder 12 comprising a further, for example fourth, pre-alignment device 41, which, for example, is directed at the first substrate side, is also provided downstream from the third application device 04, and a further magnetic cylinder 26 comprising a further, for example fourth, simultaneous alignment device 42, which, for example, is directed at the second substrate side, is provided further downstream.

Generally, further transport cylinders 12 can also be provided between the described cylinders 12; 26. Preferably, a drying and/or curing device 19 is provided in the transport path between the third simultaneous alignment device 42 and the fourth simultaneous alignment device 42, which dries or cures the previously applied coating agent containing particles P only partially, that is, not on the respective entire surface area.

In another variant of the above-described machine 01, the part comprising the third application device 04 and the succeeding fourth pre-alignment device and fourth simultaneous alignment device 41; 42, together with the assigned cylinders 12; 26, can be dispensed with.

In another variant, as an alternative or in addition to the aforementioned variant, the part comprising the third pre-alignment device 41 as well as the third simultaneous alignment device 42, together with the assigned cylinders 12; 26, can be dispensed with.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A device for aligning magnetic or magnetizable particles (P) contained in a coating agent (06) applied to one side of a web-format or sheet-format substrate (02), the device comprising:

an alignment device (41; 42), which comprises one or more magnetic elements (43; 44) that, during normal operation, are fixed to a frame at a transport path so as to, in a working position (A), enter or be able to enter into magnetic interaction with magnetic or magnetizable particles (P) on the substrate (02) to be guided past the device along the transport path, the one or more magnetic elements (43; 44) being arranged at a carrier (46) that extends transversely to a transport direction (T) over a working width provided for processing the substrate (02), characterized in that the carrier (46) is mounted, on both sides, in or at at least a respective guide (47; 48), which are provided directly in frame walls (38; 39) of the frame carrying the alignment device (41; 42) or at or in side panels (54; 56) arranged at the frame walls (38; 39), and that the carrier (46) is mounted so as to be movable, together with the magnetic elements (43; 44), overall, by way of a translatory movement in or at the guides (47; 48), in a guided manner, along a movement path from the working position (A) into a makeready position (R) that is spaced apart from the working position (A), and that the guide (47; 48) is configured in a manner of a guide groove (47; 48), in which a corresponding carrier-side support element (49; 51) engages.

2. The device according to claim 1, characterized in that two guides (47; 48) are provided at each end face of the carrier (46) to be guided, which cooperate with two carrier-side support elements (49; 51) that are in each case spaced apart from one another.

3. The device according to claim 1, characterized in that an exit (52; 53) from the guide groove (47; 48) is provided at a point of the guide groove (47; 48) which is spaced apart from the position assumed in the working position (A) toward the makeready position (R), through which the particular support element (49; 51) can exit or be guided out of the relevant guide groove (47; 48) in the removal position.

4. The device according to claim 1, characterized in that side parts (54; 56) are detachably arranged at the frame walls (38; 39) of the frame carrying the alignment device (41; 42).

5. The device according to claim 1, characterized in that the carrier (46) can be moved by a gear wheel-based linear drive (58; 59) by way of a gear wheel (58) engaging in a gear pattern.

6. The device according to claim 5, characterized in that the gear wheel (58) can be driven by way of a gear mechanism (62).

7. The device according to claim 1, characterized in that, in the working position (A), the alignment device (41; 42) is arranged at a point of the transport path which is located opposite a cylinder circumferential section, located in the transport path, of a cylinder (12; 26) transporting the substrate (02) at the transport path.

8. The device according to claim 7, characterized in that the cylinder (26) is formed by a magnetic cylinder (26), which in a region of an outer circumference thereof comprises a plurality of magnetic elements (24) arranged in a matrix-like manner so as to align, in each case in an image-producing surface area, at least some of the particles (P) in a defined manner.

9. The device according to claim 7, characterized in that the cylinder (12) is formed by a transport cylinder (12) transporting sheet-format substrate (02) downstream.

10. The device according to claim 7, characterized in that the guides (47; 48), along the movement path, in terms of a shape thereof, are configured so as to initially lead the carrier (46), from the working position (A), away from the cylinder (12; 26) with a first radial directional component which is greater compared to a first tangential directional component, and then move the carrier (46) away from the cylinder (12;

26) with a second tangential directional component which is greater compared to a second radial directional component.

11. A machine (01) for generating optically variable image elements (03) on a substrate (02), the machine (01) comprising a substrate infeed (13), from which the substrate (02) to be processed can be fed to the machine (01), at least one application device (04), by which a coating agent (06) containing magnetic or magnetizable particles (P) can be applied onto at least a first side of the substrate (02) that is guided through the machine (01) on a transport path, a product receiving system (22) used to receive the substrate (02) to be processed in the machine (01), and a magnetic cylinder (26) provided in the transport path of the substrate (02) between the at least one application device (04) and the product receiving system (22), the magnetic cylinder (26) including a plurality of magnetic elements (24) around a circumference, the alignment device (41; 42), as recited in claim 1, being arranged upstream from the magnetic cylinder (26) and/or the alignment device (41; 42) being assigned to the magnetic cylinder (26) at the transport path and being provided in the transport path of the substrate (02).

12. The machine according to claim 11, characterized in that, downstream from a first application device (04), at least a first one of the alignment device (41) is arranged upstream from the at least one magnetic cylinder (26) in the transport path, serving as a pre-alignment device (41), and/or at least one other alignment device (42) is assigned opposite the at least one magnetic cylinder (26) in the transport path, serving as a simultaneous alignment device (42).

13. The machine according to claim 12, characterized in that a plurality of the application devices (04) are provided, and that at least one magnetic cylinder (26) and at least the first alignment device (41) serving as the pre-alignment device (41), which is arranged upstream from the magnetic cylinder (26) in the transport path, and/or the at least one other alignment device (42) serves as the simultaneous alignment device (26), which is assigned to the magnetic cylinder (26), are provided downstream from a plurality of or each of the application devices (04).

14. The machine according to claim 11, characterized in that only one or more cylinders (12; 26) are provided for the transport of the substrate (02) between the application device (04) and the magnetic cylinder (26), via which a transfer of the substrate (02) from cylinder (12; 26) to cylinder (12; 26) can be effectuated and/or that the alignment device (41) arranged upstream from the magnetic cylinder (26) is provided around a circumference of a cylinder (12), configured as a transport cylinder (12), and located opposite a transport path of an outer cylindrical surface of the transport cylinder (12).

* * * * *